May 3, 1938.  C. BREER ET AL  2,115,903
MOTOR VEHICLE BODY
Filed March 11, 1935  5 Sheets-Sheet 3

INVENTORS.
Carl Breer,
Alexander G. Herreshoff,
Oliver H. Clark,
BY Robert Cadwallader.
Harness, Dind, Patee & Harries —
ATTORNEYS.

May 3, 1938.   C. BREER ET AL   2,115,903
MOTOR VEHICLE BODY
Filed March 11, 1935   5 Sheets-Sheet 4

INVENTORS.
Carl Breer,
Alexander G. Herreshoff,
BY Oliver H. Clark,
Robert Cadwallader.
Harness, Dind, Patee & Harris
ATTORNEYS.

May 3, 1938.   C. BREER ET AL   2,115,903
MOTOR VEHICLE BODY
Filed March 11, 1935   5 Sheets-Sheet 5

INVENTORS.
Carl Breer,
Alexander G. Herreshoff,
Oliver H. Clark,
BY Robert Cadwallader.
ATTORNEYS.

Patented May 3, 1938

2,115,903

UNITED STATES PATENT OFFICE 2,115,903

MOTOR VEHICLE BODY

Carl Breer, Grosse Pointe Park, Alexander G. Herreshoff, Grosse Pointe Village, Oliver H. Clark, Detroit, and Robert Cadwallader, Highland Park, Mich., assignors to Chrysler Corporation, Highland Park, Mich., a corporation of Delaware Application March 11, 1935, Serial No. 10,403

41 Claims. (Cl. 296—28)

This invention relates to motor vehicles and refers more particularly to improvements in body structures of motor vehicles.

It is an object of our invention to provide a motor vehicle body structure having improved characteristics of strength and rigidity.

A further object of our invention is to provide a body structure fabricated in an improved manner from steel panels, steel rails, channels, braces and the like connected together to provide a substantially unitary rigid structure having improved strength and durability.

Another object of our invention in a more limited aspect thereof is to provide an improved body structure having the component parts thereof largely connected by welding.

Another object of our invention is to provide a body structure of relatively great strength and rigidity for the weight thereof.

Further objects of our invention are to provide a body comprising an improved truss-like structure; to provide a body structure fabricated in an improved manner to afford relatively great strength accompanied by improved stress distribution between the structural body parts, and freedom from rattle or wearing between the component body parts; and to provide an improved steel body structure adapted for manufacture at relatively low cost commensurate with the advantages obtained by reason of our construction.

An additional object of our invention is to provide a truss-like body structure adapted to efficiently distribute the stresses throughout the body incident to its weight and to the loads applied thereto from the ground wheels.

A further object of our invention in its more limited aspects is to provide a body structure fabricated in a novel manner from pre-formed, built-up, or assembled main body panels or sub-assembly units.

Further features of our invention relate to the provision of novel relatively strong, durable, and efficient joint structures or connections between the various component parts of our body structure; to the provision of improved means for utilizing the plates, panels, or shells of the body structure to carry a portion of the stresses; and to the provision of improved means for bracing the body parts.

Further objects and advantages of our invention will be more apparent from the following illustrative embodiments thereof, reference being had to the accompanying drawings, in which:

Fig. 1A is a detail sectional view through a body lower side rail, the section being taken along the line 1A—1A of Fig. 1.

Fig. 9 is a detail sectional perspective view illustrating one of the rear door rear post or column structures and associated rear floor, cross-bracing, top and rear panel structures.

Figures 1, 2:
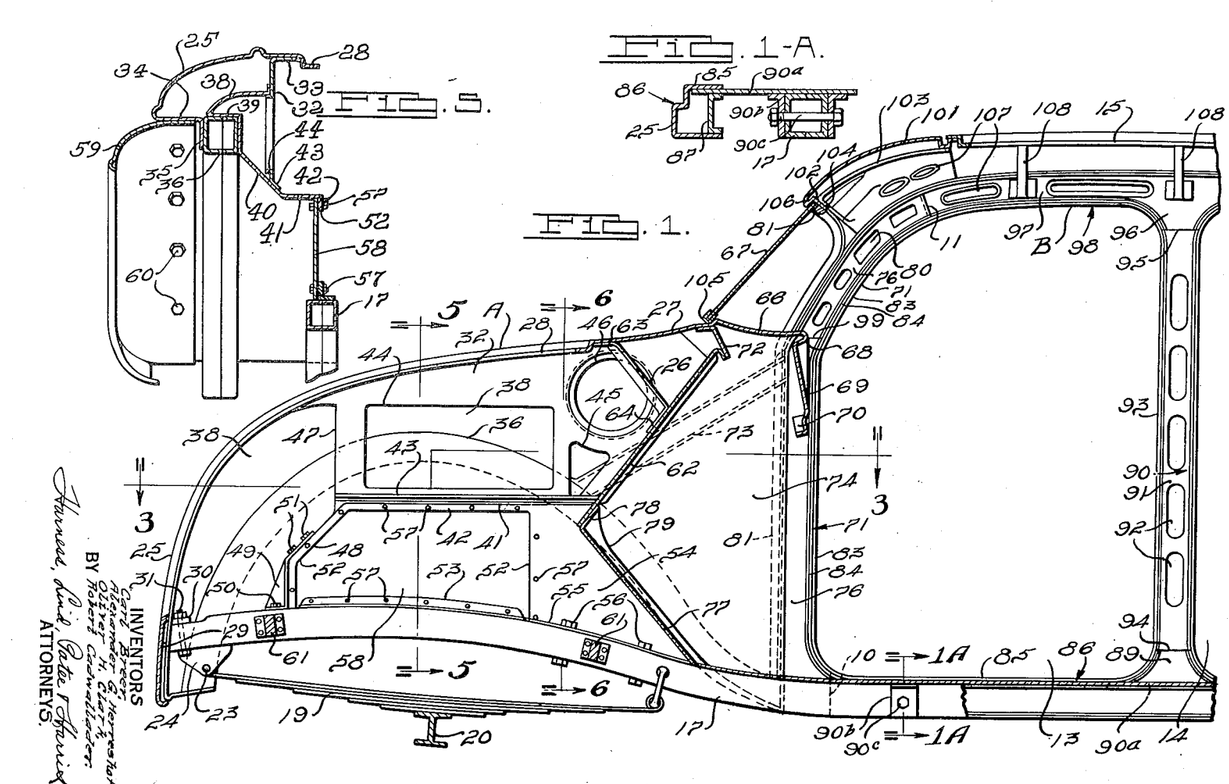
Fig. 1 is a sectional elevational view of a portion of the vehicle body forwardly of the intermediate door post, the section being taken along the vertical longitudinal mid-plane of the body.
Fig. 2 is a similar view rearwardly of the intermediate door post.

Referring to the drawings, we have illustrated our invention in connection with a motor vehicle body of the closed type which, for a four door type sedan, may have the general appearance illustrated in Figs. 1 and 2. It will be understood that, in its broader aspects our invention is not limited to any particular appearance, type or shape of the body of the motor vehicle as a whole as these may vary within wide limits according to preference.

Our body structure is, in general, of all-steel unitary construction fabricated from steel-panels, shells, or the like, pressed steel rails, channels, columns, plates and braces. The component parts are preferably for the most part welded into one unitary rigid structure of improved strength and durability. We prefer to largely weld the component parts of the body structure since, among other advantages, the welding provides permanence of assembly, relatively great strength accompanied by efficient stress transference between the welded parts, freedom from rattle or weaving between the various parts, and reduction in weight and manufacturing cost of the body structure as a whole.

Rivets or bolts may be employed to facilitate the final assembly of certain main assemblies to other main structures and we desire to point out that, in the broader aspects of our invention, we do not limit our invention to the particular type of connecting means hereinafter more particularly described in order to illustrate one concrete form which our invention may assume, it being readily apparent that other fastening means may be employed as desired.

In general, according to the illustrated preferred embodiment of the principles of our invention, we have provided a body construction which may be fabricated from a plurality of pre-formed, built-up or assembled main body panels or sub-assembly units although, if desired, the entire body structure may be fabricated or built-up without first providing the aforesaid pre-formed main panels or sub-assemblies and the like. We prefer, however, to provide such pre-formed main structures as the manufacture, assembly, and servicing of the body structure is greatly facilitated thereby. In practice, these main panels or sub-assemblies may vary, as desired, both in the number of such main component panels or sub-assembly structures and in the formation of the structural parts thereof within keeping of the broader principles of our invention.

According to the illustrated embodiments of our invention, the body structure is preferably formed of four main structural portions adapted to be welded together to form a rigid unitary body structure, such main portions comprising the front body section A, the similar body side panels B and C, and the body rear panel D.

Figures 7, 8:
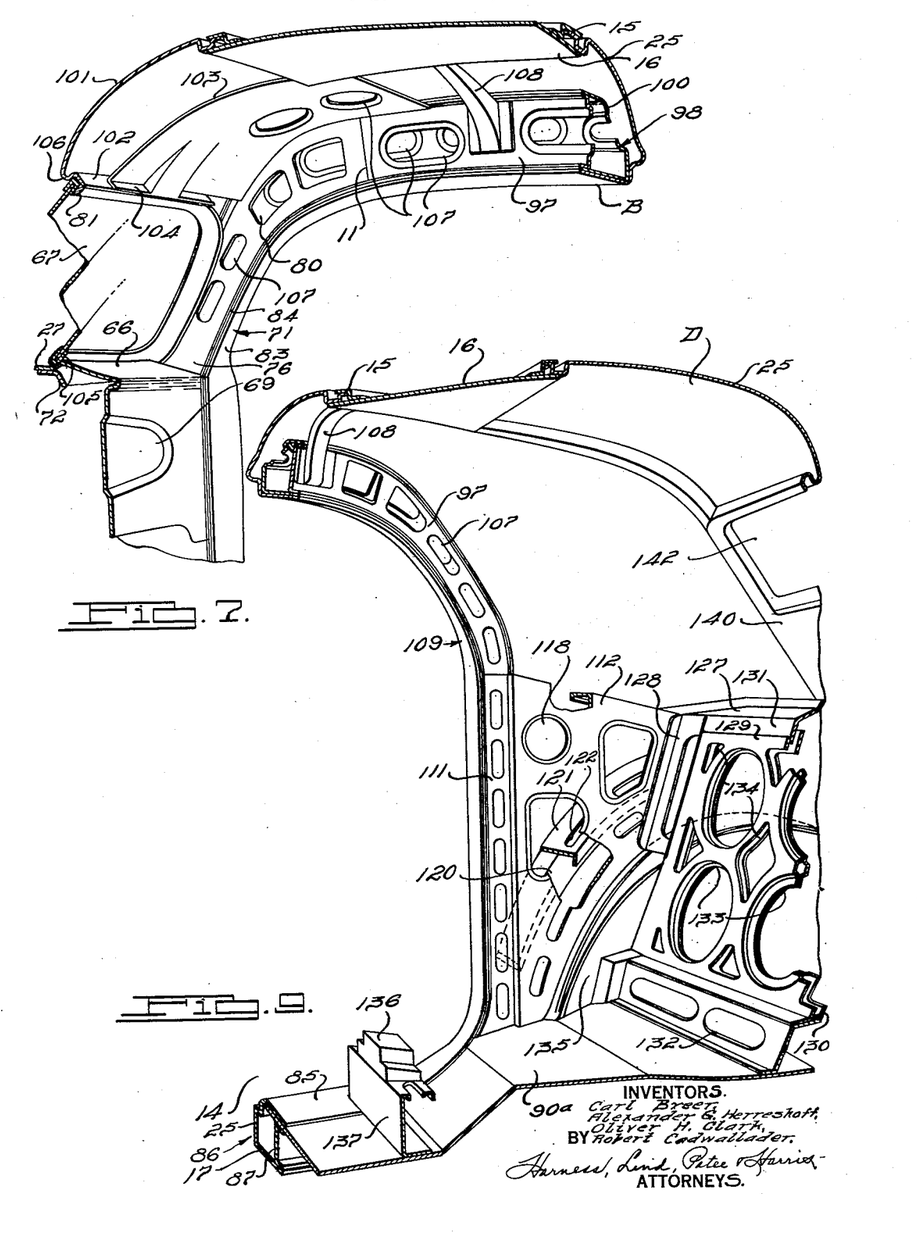
Fig. 7 is a detail perspective sectional view illustrating the upper part of one of the front door forward post or column structures and associated dash, windshield, and top structures.
Fig. 8 is a sectional elevational view transversely through a portion of the rear of the body structure, the view being taken along the line 8—8 of Fig. 2.
Figure 8:
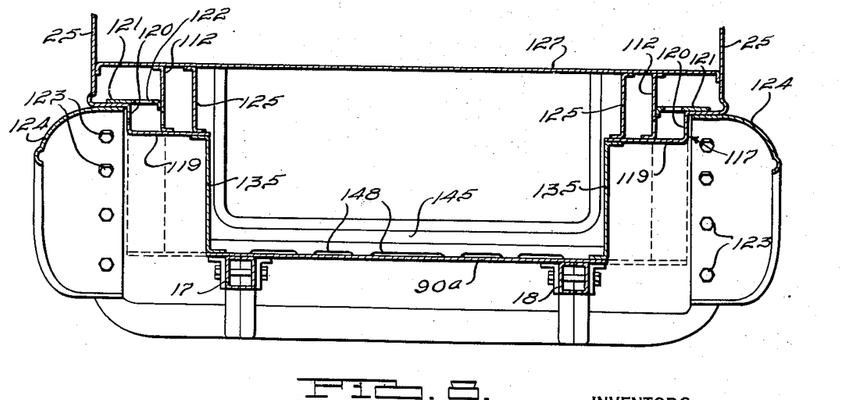

The front section A, as will be apparent from Figs. 1 and 7, is connected by welding to the typical side panel B as generally indicated at 10 and 11 and to the other side panel C in a similar manner. The side panels B and C are connected by welding to the rear panel D along or in the vicinity of the downwardly meeting edges of the side and rear panels as generally indicated at 12 in Fig. 4.

It will be understood that the various welded joints do not appear when the finished body is viewed since the external welds are covered by the usual enamel-like paint and the internal welds which are not otherwise hidden from view by the body structure itself are covered by the interior trim and finish customarily employed in general body practice or else by paint or other finish panels as desired. Our invention is more particularly directed to the body structure, and the details of the trim, finish and the like will, for the most part, be omitted from our disclosure. In practice, any type of welding may be employed which is best suited to the particular joint or connection dealt with and we have found it expedient to employ flash-welds, butt-welds, arc-welds, and gas-welds at different points in the structure.

Thus by way of example, in the assembly the side panels B and C are flash-welded along the rear panel edge joints 12 and then joined in a unit to the front section A. Where the front section A meets the side panels B and C at the open ends, the header joints at the top are flash welded on the outside and are suitably welded on the inside. The lower ends 10 are gas-welded on the outside and arc-welded on the inside although we do not limit our invention in its broader aspects to welded connections or to any particular types of welds where this form of connection is employed.

The side panels B and C in the case of the sedan type of body each provide openings 13 and 14 for the usual front and rear doors (not shown) and the four main body assemblies A, B, C, and D together provide the roof opening 15, best seen in Fig. 1. This roof opening is filled in with a suitable cover structure 16 illustrated in Figs. 7 and 9 and hereinafter referred to in detail.

While, within the broader aspects of our invention, the body structure may be directly supported as a rigid unit by the vehicle road wheels, with appropriate springing intermediate the wheels and body, we prefer according to the illustrated embodiment of our invention to provide a vehicle chassis including the main side rails or sills 17, 18 (see Fig. 6) and suitable cross members. This chassis structure is relatively light in weight and is provided primarily to facilitate the manufacture and assembly of the motor vehicle whereby the chassis may be assembled and the body structure assembled independently thereof as a separate unit. The body assembly may then be conveniently mounted on the chassis assembly and welded or bolted thereto as will be presently more apparent.

The chassis side rails 17 and 18 are tension members and are adapted to transmit a portion of their load in a novel manner to the body structure, the latter receiving the major portion of the total load directly at the points of body support for distribution of the stresses throughout the truss-like body structure.

Thus, each usual front steering ground wheel (not shown) is sprung in any desired manner as by the leaf spring 19 associated with the front axle 20 as shown in Fig. 1. These springs 19 are respectively connected to the chassis rails 17 and 18 at the forward and rear ends preferably at or close to points where main compression members of the body frame join the chassis rails whereby the major portion of the stresses passes directly to the body structure. Likewise the rear driving ground wheels 21, one of which is shown in Fig. 2, are connected through rear supporting springs 22 to the chassis rails 17 and 18 at or adjacent to points of load distribution to the body structure. Other well-known or suitable forms of wheel springing may be employed as desired within keeping of the spirit of our invention.

It will be understood that the body and chassis structures are for the most part symmetrical about the longitudinal vertical central plane through the vehicle so that in most instances the description will be limited to the typical structure along the right hand half of the body. The forward end of spring 19 as best seen in Fig. 1 is pivoted to a supporting shackle bolt 23 carried by the downwardly extending shackle bracket 24 fixed to rail 17 at the forward end thereof.

Figure 5:
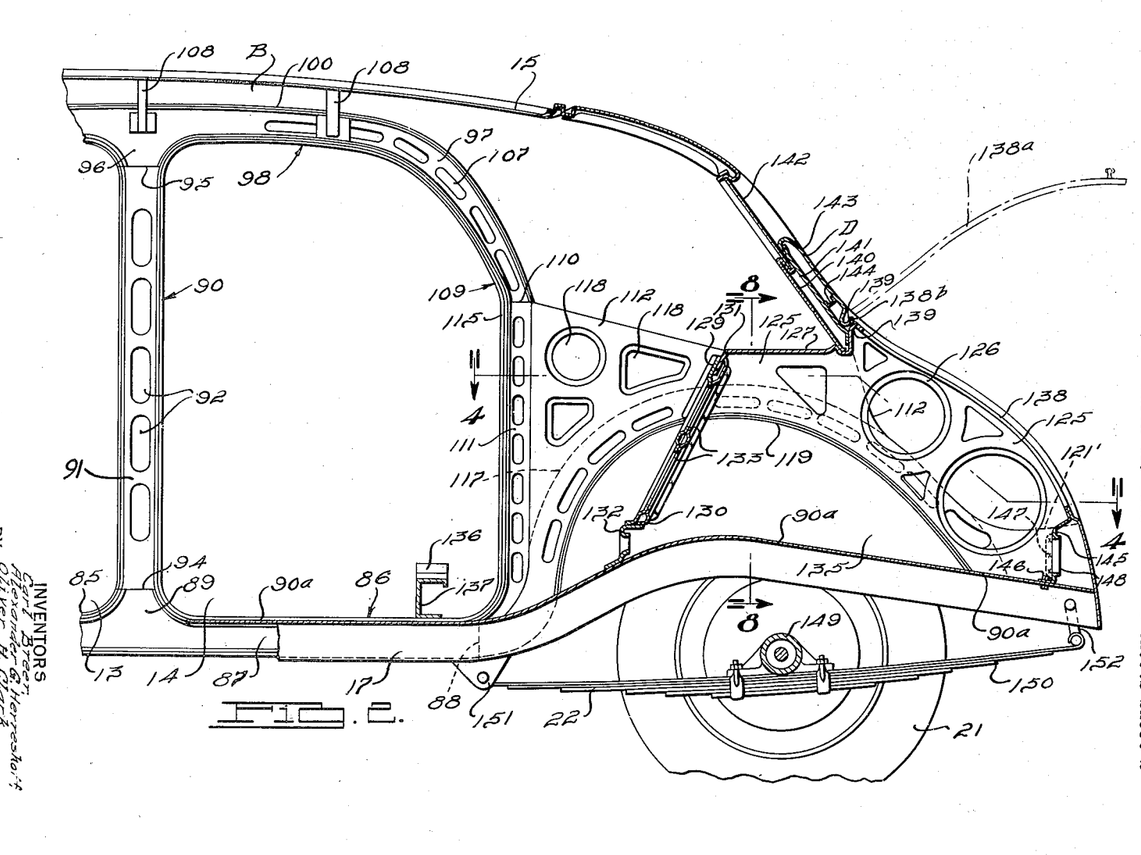
Fig. 5 is a sectional elevational view through one of the hollow cowl beams, the section being taken along the line 5—5 of Fig. 1.
Figure 6:
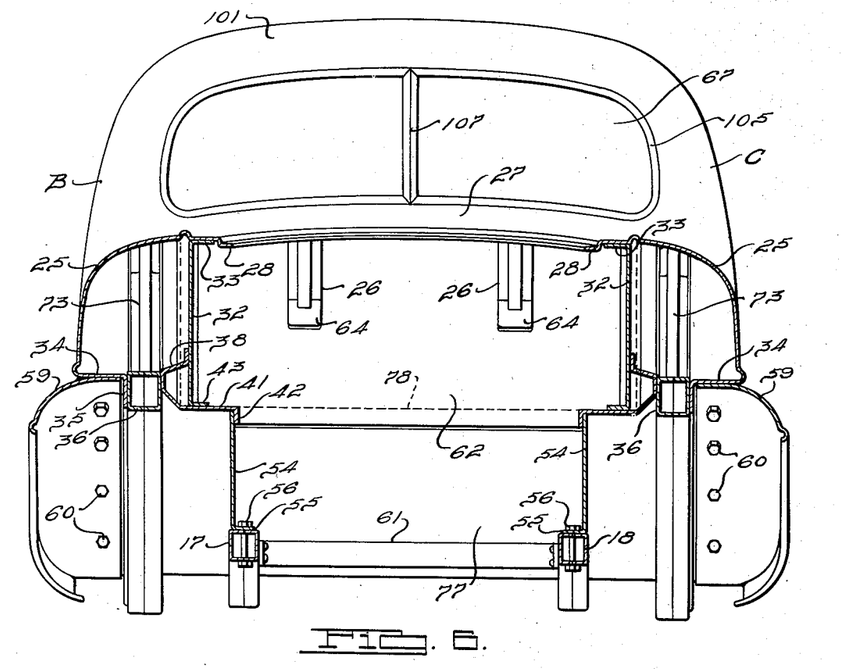
Fig. 6 is a sectional elevational view transversely through the body, the section being taken along the line 6—6 of Fig. 1.

Each cowl beam structure has an outer panel or skin 25 forming the outer finish of the body, these panels merging rearwardly to the dash braces 26 to provide the transverse cowl panel 27. Forwardly of the dash braces 26, the outer panels 25 curve upwardly and inwardly as shown in Figs. 5 and 6 and each terminates in a transversely spaced off-set lip or hood-receiving flange 28. These flanges 28 merge transversely at the dash braces 26 and extend forwardly and downwardly to the lower ends of the cowl beams thus providing a space to receive the vehicle engine, radiator, and other usual hood-enclosing vehicle parts all of which are omitted from our disclosure as they do not form a part of our present invention. The flanges 28 support a hinged hood cover, this hood being omitted from our disclosure.

For stiffening the lower depending ends of the cowl beams transversely thereof, these cowl beams may be connected by a cross brace 29 which may be formed by extending the lower end portions of the outer panels 25 inwardly, the cross brace thus being unitary with the side panels in similar fashion to the merging of these panels to provide the aforesaid cowl panel 27. If desired other cross braces between the cowl beams may be provided.

Adjacent the lower ends of each cowl beam, the cross brace 29 has welded to the inner surface thereof the angled connector 30. These connectors provide for removable connection between the body at the forward end thereof and the chassis rails 17 and 18 by reason of the bolts 31.

Cooperating with each outer panel 25 to provide a hollow cowl beam structure is an inner vertical plate or wall member 32 which has an inwardly extending flange 33 at its upper end underlying the inner portion of panel 25 and welded thereto as shown in Fig. 5, the hood supporting flange 28 being thereby reinforced.

Each panel 25 has an inwardly bent flange 35 to which is welded one side of the hollow box-like beam 36 which arches to provide a wheel house from the front end of the cowl beam rearwardly into structural continuity with one of the main body side rails 86, as will presently be more apparent.

Each cowl beam is completed by a further dished plate member 38 which, for the cowl beam portion opposite plate 32 as shown in Fig. 5, has a return bent flange 39 formed around two sides of beam 36 and welded thereto. The flange 39 extends downwardly and inwardly from beam 36 to provide the angled support plate 40 terminating in the horizontal shelf 41 and vertical flange 42. The lower end of the plate 32 has an angled lower flange 43 welded to the plate 40. Toward the rear the shelf 41 is wider so that flange 43 is welded thereto as shown in Fig. 6.

Figure 3:
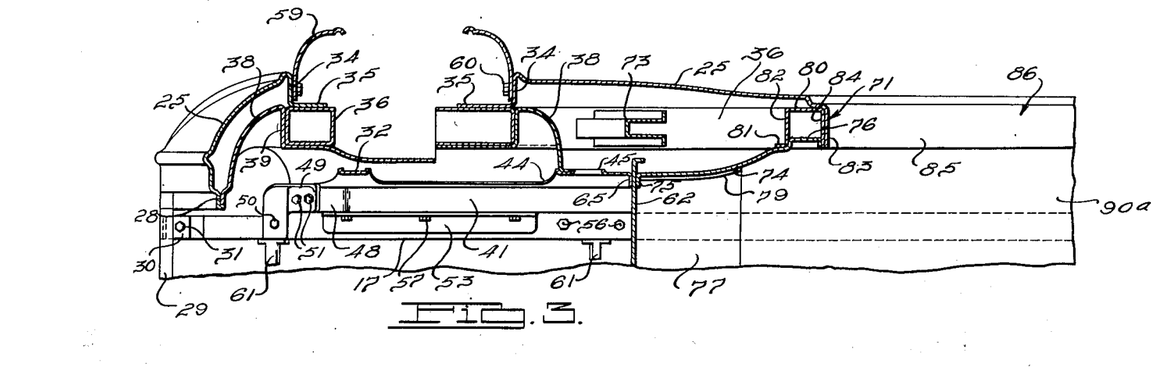
Fig. 3 is a sectional plan view through one of the forwardly extending hollow cowl beams, the section being taken along the line 3—3 of Fig. 1.

The plate 32 has a series of openings 44, 45, 46 preferably provided with a flanged border whereby the plate is relatively light in weight and resistant against distortion. The plate 32 terminates along the forward edge 47, the shelf 41 extending forwardly and downwardly therebelow along with the flange 42 to provide the support leg 48. This leg is connected to the chassis rail 17 by a bracket 49 bolted at 50 and 51 respectively to the rail 17 and the downward extension of shelf 41 as best seen in Figs. 1 and 3.

The leg 48 and flange 42 provide the forward and top sides of an opening 52, the lower side being provided by rail 17 and angled bracket 53 bolted thereto while the rear side is formed by a downward extension 54 of the flange 42. As seen in Fig. 6 this extension 54 has a lower flange 55 bolted at 56 to rail 17. The marginal portions of opening 52 are perforated to removably receive bolts or fasteners 57 which removably attach a closure plate 58 to the sides of the opening. By removing the plate 58 convenient access is had through the wheel house structure to the engine for servicing and the like.

Each cowl beam structure provides a housing for a front wheel and has associated therewith a fender 59 removably attached by bolts 60 to the flange 34 of outer panel 25.

Suitable cross-braces 61 may be provided at appropriate points between chassis rails 17 and 18 for supporting the engine, transmission, etc., and for strengthening the chassis.

Extending transversely between the rear ends of the vertical plates 32 and welded thereto is a dash member 62, the aforesaid dash braces 26 having upper and lower flanges 63 and 64, respectively, welded to the under face of cowl panel 27 and to the dash 62. As shown in Fig. 3 each dished plate 38 terminates rearwardly of the wheelhouse in a flange 65 welded to the forward face of dash 62.

The cowl panel 27 extends rearwardly to provide a shelf 66 rearwardly of windshield 67 and then is return-bent at 68 for strengthening the depending instrument panel 69. This panel has side flanges 70 welded respectively to the forward front door columns or pillars 71.

The lower edge of windshield 67 is welded to cowl panel 27 and preferably immediately therebelow is the transverse brace 72 welded at its upper flanged edge to the cowl panel 27 and along its lower edge to the upper flange of the dash 62 thereby bracing the windshield through the dash.

As a further means of adding rigidity to the front structure A and for transference of a portion of the load at the chassis rails 17 and 18 through the hollow cowl beam structures to the rear body structure including the side members B, we have provided the oblique compression struts or braces 73 each preferably formed channel shaped and welded at its lower end to a box beam 36 and at its upper end to a column 71, the arched box beam 36, strut 73 and column 71 lying in a common plane.

The inner wall 32 of each cowl beam acts as a component thrust member between the chassis rail 17 and column 71 by reason of the support leg 48 at the front of plate 32 and at the rear thereof by reason of the inner side wall or plate 74 welded at its forward flange 75 to dash 62. The rear of plate 74 has a channel 76 forming the inner wall of hollow column 71 as best seen in Fig. 3.

The lower edge of dash 62 is braced by a sloping metal floor plate or toe board panel 77 having an upper flange 78 welded to the dash and having side flanges 79 welded to the respective plates 74, it being noted from Figs. 1 and 6 that plates 54 and 57 merge as unitary panels along the sides of the floor panel 77.

The column 71, in addition to the channel 76, has the outer deeper channel 80 flanged at 81 for welding to plate 74. The forward wall 82 of the column is a continuation of the upper wall of the box beam 36, these walls being welded for convenience of manufacture at the intersection of beam 36 and column 71. The outer skin 25, which takes a portion of the cowl beam load, is bent at 83 around the rear wall 84 of the column and continues at the bottom of the column rearwardly to provide the door sill 85, the channel 76 and walls 83 and 84 being welded together.

The channel 76 terminates at the aforesaid weld joint 10 in Fig. 1, the body lower sill or rail 86 of a side section B being shown in cross section in Fig. 1A. The outer member is thus formed of the skin 25 and the inner member 87 is a channel piece which extends rearwardly to the weld line 88 shown in Fig. 2, the channel 87 having an intermediate upstanding arm 89 which forms a part of the intermediate column 90.

In Fig. 1A it will be noted that intermediate the door sill 85 and the upper flange of the inner channel 87 is the outer edge portion of the metal floor 90a, these parts being welded together. The floor 90a extends across the body to the other lower rail 86 at the other side, the floor resting on the chassis rails 17 and 18 and being removably secured thereto to hold the intermediate portion of the body against movement relative to the chassis rails. This fastening means is shown comprising brackets 90b welded to floor 90a and bolted at 90c through the rail 17 it being understood that this fastening means is repeated at suitable intervals along that portion of the floor which lies between the body end columns.

The intermediate column 90 has an inner channeled member 91 lightened by perforations 92 and an outer channel 93 formed by the skin 25 in continuity with the bottom sill 86. The inner channel 91 is welded at 94 to arm 89 and at 95 to the arm 96 of the inner channel member 97 of the body top sill or rail 98, the latter being welded at 11 to the upwardly and rearwardly projecting end of the front column 71.

The column insert 76 (Figs. 1 and 3) may terminate at 99, the channel 80 continuing to weld joint 11 and structurally therebeyond by reason of the channel 97. The top rail 98 (see Fig. 7) is also of hollow beam structure and has an outer deep channel 100 welded to the inner channel 97. It should be understood that weld joints 10 and 11 may have their parts overlapped or suitable members inserted in the rails at the joints arranged in overlapping relationship with the joints for strengthening the joints, our disclosure for simplicity indicating the weld joints in simple structural form.

The outer skin 25 extending upwardly from columns 71 and 90 is bent outwardly as shown in Fig. 7 from the top rail 98 and inwardly thereabove to provide the channeled roof opening 15 for supporting any suitable roof structure shown in simple form at 16 in Fig. 9. This roof forming structure at the front slopes downwardly at 101 to form the windshield supporting flange 102, a beam forming stiffener brace 103 extending at the top of the body and spaced within the outer skin portion 101 at each side of the body. Each brace 103 is welded at its outer side edge to the flanges of the channel 97 as shown in Fig. 7 and along its lower flanged edge 104 to the flange 102.

The windshield frame 105 is welded at its lower edge to the cowl panel 27, the upper and side edges being welded between the return bent bead 106 of skin portion 101 and an extension of the aforesaid flange 81 as best seen in Fig. 1. A central welded-in windshield brace 107 strengthens the skin portion 101 by connecting the same through cowl panel 27 and brace 72 to the dash 62.

The channels 80 and 97 as well as other parts of the structure may be lightened without sacrificing the desired strength by a series of punched out openings having their edges embossed, these openings being indicated at 107. In order to brace the inwardly overhanging edge portions of the skin 25 forming the roof opening 15 we have provided a series of braces 108 welded to channel 97 and to the inner surface of skin 25 at the channeled opening 15 thereof.

The typical top body rail 98 continues rearwardly beyond the intermediate column 90 and then slopes downwardly to form the rear column or door pillar 109. The inner channel 97 terminates at 110 and structurally continues downwardly by reason of the inner channeled end 111 of a vertical longitudinally extending stiffener brace plate 112. The outer column forming channel 113 is a continuation of the top rail outer channel 100 with an additional flange 114 formed thereon and welded to the plate 112. The outer skin 25 forms the forward and outer column flanges 115 and 116 welded in place, the outer skin extending rearwardly and around the curved rear portion of side section B to the weld line 12 for welding to the back or rear panel D.

The column 109 extends downwardly and then forwardly to form the bottom body rail 86, the box-beam 117 branching from the junction of column 109 and rail 86.

Figure 4:
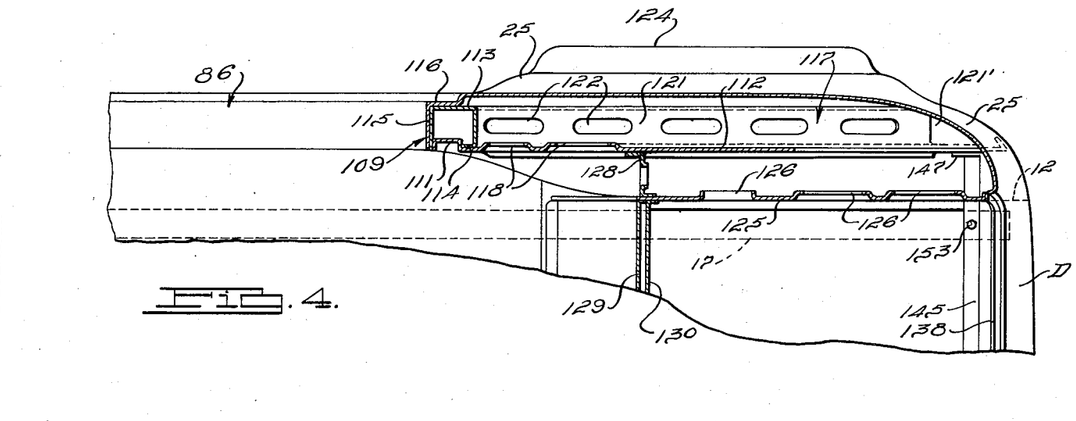
Fig. 4 is a detail sectional plan view taken along the line 4—4 of Fig. 2.

The plate 112 has holes 118 formed therein and bordered by stiffening flanges shown in Fig. 4, the rear of the plate being welded to the inner surface of the outer skin 25. In this manner we have provided a strong hollow trussed rear body structure utilizing the outer skin.

The box-beam 117 is arched to provide a rear wheel house beam, the lower wall 119 and outer side wall 120 thereof being formed as an inner extension of the side portion of outer skin 25 as best shown in Fig. 8. The plate 112 forms the inner wall of beam 117, an arched top plate 121 perforated at 122 forming the top wall. At the rear, the beam 117 is welded to the floor 90a and by a rear beam extension 121' of the plate 121 to the end curved portion of outer skin 25.

Removably secured by fasteners 123 to each rear wheel house structure is a rear wheel fender 124.

Spaced inwardly from the plate 112 is a second vertical brace plate 125 lightened by ribbed openings 126. The plate 125 (see Fig. 8) has upper and lower flanges welded respectively to a transverse horizontal shelf brace 127 and to the lower wall 119. At its forward end the plate 125 is braced laterally by a vertical flanged cross plate 128 welded to plates 112 and 125.

The inner plates 125 are braced across the body by a pair of slanting plates 129 and 130 which form a hollow plate beam. These plates form a back for the rear seat of the vehicle, in addition to providing a cross brace. At the upper edges of plates 129 and 130, these plates receive the forwardly down turned edge 131 of the shelf therebetween, the plates being welded in place.

At their lower edges, the plates 129 and 130 have forwardly bent flanges welded to a transverse supporting plate 132, the latter being welded to the floor 90a.

The plates 129 and 130 are brought together and welded at spaced intervals bounding openings 133, other openings 134 further lightening the weight of the plates.

At the sides below the cross plate 128 the plates 129 and 130 are flanged for welding to a vertical wheel house inner wall 135 (see Fig. 8), each wall being welded between a lower wall 119 and a side boundary of floor 90a, this floor being relatively narrow between the rear wheel houses.

For supporting the front of the rear seat (not shown) we have provided the support blocks 136 mounted on a transverse channel member 137 welded to floor 90a.

The rear edge of the inner plate 125 is welded to the outer skin 25 at the rear of side member B.

The back panel D has an opening bounded by a flange 138 to provide access to the baggage compartment rearward of plates 129 and 130, the flanged opening being adapted to receive a suitable door closure 138a hinged at 138b. The rear edge of the shelf 127 turns upwardly at 139 and welds into the upper portion of the flanged opening 138. Plates 140 and 141 are welded in spaced relation to the shelf 127 to provide a slide for the rear window 142, the rear panel portion 143 being braced by a transverse channel connector member 144.

The rear portion of the body structure is braced by a transverse member 145 having its lower flange 146 welded to the floor 90ᵃ, the upper edge being bent to lie under the flange 138 for welding thereto. The brace 145 has side flanges 147 welded to the plates 112, flanged openings 148 reducing the weight of the brace.

The rear driving wheels 21 are supported by an axle 149 carried by the rear springs 150 shackled forwardly at 151 to chassis 17 at the juncture of the column 109 and beam 117 whereby a portion of the chassis load is transmitted to the body structure, it being further noted that the brace support 132 and plates 129, 130 further serve to transmit a portion of the stresses to the body structure.

The rear end of each rear spring 150 is shackled at 152 adjacent the rear end of one of the chassis rails, a portion of the load passing through plates 112, 125 and beam 119 to the rear column portion 109 of the top rail 98.

A bolt 153 removably secures the brace 145 to chassis 17, it being apparent that the entire body structure is removably secured to the chassis for convenience of assembly and service.

We find it expedient, by way of example, to completely assemble the front section A and then to join this assembly with a rear assembly formed of the side panels B and C together with the rear panel D and the various cross bracings, the completely assembled body structure being then bolted to the chassis structure.

It will be apparent that we have provided a body structure wherein a truss construction is employed to resist the applied forces through definite structural members in which the primary stresses are the simple stresses of tension or compression, the severe bending stresses present in conventional types of automobile bodies and frames being largely eliminated. Thus, the body and chassis longitudinally extending lower side rails 86 are in tension and the forward cowl beams and rear beam forming plate members as well as the roof portions of the body top rails 98 are in compression when a static load, due to the weight of the vehicle and passengers, is on the wheels. The spaced plates 112 and 125 form sides of a rigid hollow beam supplemented by the box beam 119 providing substantially a continuation of a roof rail 98 rearwardly to the rear load point or region provided by the rear spring shackle 152.

We have thus provided compression taking strut structures for transferring forces from the engine and front wheel supporting frame structure to the front columns 71 and roof rails 98. One strut structure comprises the side cowl beams which extend upwardly and rearwardly from the engine supporting frame structure to the columns 71. Another strut structure comprises the box beams 36 and associated extension braces 73 which preferably extend upwardly and rearwardly from the engine frame structure to join columns 71 at the juncture of the lower vertical portions and the upper rearwardly sloping windshield portions whereby to efficiently transmit the forces to the roof rails without objectionable bending in the columns. These strut structures are preferably hollow beams for lightness of weight and rigidity.

The spring reactions are transmitted largely to the body structure in an improved manner, the front spring reaction and engine loads being transmitted directly through the rearwardly and upwardly inclined cowl beam structures of the front body section A to the front door columns 71 and top rails 98. The body shell or outer skin, in most instances, is constructed to take a portion of the loads in conjunction with stiffener plates or braces thereby minimizing the body weight.

While the chassis sills may be dispensed with, if desired, and the total loads taken directly by the body structure, we prefer largely for manufacturing and assembly convenience to provide the relatively light chassis structure as illustrated although even in such instance the loads are largely taken by the trussed body structure.

Various modifications and changes will readily be apparent from the teachings of our invention and many changes may be made within the scope and spirit of our invention as defined in the appended claims, our invention in its broader aspects not being limited to the foregoing described illustrative embodiment.

We claim:

1. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, said body structure including laterally spaced door column structures forwardly at the sides of said compartment, and means for structurally connecting said hollow beam structures respectively to said door column structures.

2. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, and a curved beam structurally connected to each of said hollow beam structures for stiffening the latter.

3. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, and means providing a second hollow beam curved about at least a portion of each of said wheel houses and structurally respectively connected to the first said hollow beam structures for reinforcing the latter.

4. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, said body structure including laterally spaced door column structures forwardly at the sides of said compartment, and means for structurally connecting said hollow beam structures respectively to said door column structures, said connecting means including a reinforcing beam structurally connected to each of said hollow beams and curved respectively about at least a portion of said wheel houses.

5. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, said body structure including laterally spaced door column structures forwardly at the sides of said compartment, means for structurally connecting said hollow beam structures respectively to said door column structures, said connecting means including a reinforcing beam structurally connected to each of said hollow beams and curved respectively about at least a portion of said wheelhouses, said reinforcing beams being structurally connected to the lower ends of said door columns, and an inclined brace intermediate each of said reinforcing beams and said door columns.

6. In a motor vehicle body structure having a driver's compartment, longitudinally extending laterally spaced rails located forwardly of said compartment and adapted for structural connection to said body structure, a pair of laterally spaced hollow beam structures extending forwardly of said compartment and downwardly toward the front ends of said rails to form the front end of said body structure, means for connecting the downwardly extending ends of said hollow beam structures to the front end portions of said rails respectively, ground wheel supporting means connected to said rails and adapted to transmit at least a portion of the body supporting forces upwardly through said hollow beam structures and rearwardly therethrough between said compartment, each of said hollow beam structures providing a wheelhouse, said body structure including laterally spaced door column structures forwardly at the sides of said compartment, and means for structurally connecting said hollow beam structures respectively to said door column structures.

7. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of compression structures providing a wheel house, said body structure including laterally spaced column structures forwardly at the sides of said compartment, each of said compression structures including a wall forming the outer shell of the body structure, said outer shell having a portion thereof extending rearwardly from an associated wheelhouse to form a portion of one of said column structures.

8. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure and a substantially vertical stiffener plate secured thereto, said outer shell having a portion thereof extending rearwardly from an associated wheelhouse to form a portion of one of said column structures.

9. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced column structures forwardly at the sides of said compartment, each of said compression structures including a wall forming the outer shell of the body structure, said outer shell having a portion thereof extending rearwardly from an associated wheelhouse to form a portion of one of said column structures, and a transverse dash plate forming a front wall for said compartment and adapted to brace said compression structures.

10. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, a transverse dash plate forming a front wall for said compartment and adapted to brace said compression structures, and a body outer surface cowl forming portion connecting said walls above said dash plate.

11. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures.

12. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure and a substantially vertical stiffener plate secured thereto, said outer shell having a portion thereof extending downwardly from an associated wheelhouse to form a portion of one of said column structures, and means including a bracket secured to each of said rails and adapted to rigidly connect said stiffener plates to said rails respectively.

13. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, a transverse dash plate forming a front wall for said compartment and adapted to brace said compression structures, and a body outer surface cowl forming portion connecting said walls above said dash plate, said cowl portion having a windshield receiving portion and a shelf portion extending rearwardly therefrom, said shelf portion terminating in a downwardly extending instrument panel adapted to structurally brace said column structures.

14. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, a transverse dash plate forming a front wall for said compartment and adapted to brace said compression structures, and means for rigidly connecting opposite side portions of said dash plate to said rails respectively.

15. In a motor vehicle body structure having a driver's compartment, forward front door column structures at opposite sides of said compartment, a roof structure projecting forwardly beyond said column structures to provide a windshield frame support, laterally spaced body side rails extending rearwardly from the lower end portions of said column structures, a pair of laterally spaced compression structures extending forwardly and downwardly from said compartment to form the front end of said body structure, ground wheel supporting means associated with said column structures and compression structures and adapted to transmit at least a portion of the body supporting forces therethrough, a dash panel transversely connecting said compression structures, means for transmitting a portion of said body supporting forces to said dash panel, and means including a windshield frame brace for transmitting said forces from said dash panel to said forwardly projecting roof structure.

16. In a motor vehicle body structure having a driver's compartment, forward front door column structures at opposite sides of said compartment, a roof structure projecting forwardly beyond said column structures to provide a windshield frame support, laterally spaced body side rails extending rearwardly from the lower end portions of said column structures, a pair of laterally spaced compression structures extending forwardly and downwardly from said compartment to form the front end of said body structure, ground wheel supporting means associated with said column structures and compression structures and adapted to transmit at least a portion of the body supporting forces therethrough, a dash panel transversely connecting said compression structures, means for transmitting a portion of said body supporting forces to said dash panel, a windshield frame having a substantially central brace adapted to transmit said dash panel forces to said forwardly projecting roof structure, a cowl panel below said windshield frame and secured thereto, said cowl panel forming a continuation of a wall of said compression structures, said dash panel being adapted to transmit said forces to said windshield brace through said cowl panel.

17. In a motor vehicle body structure, a rear structure including side metal portions and a rear panel structure connecting said side portions, a fabricated front structure adapted for structural connection to said side portions, said front structure including a pair of laterally spaced wheelhouse forming compression structures adapted to transmit a portion of the body supporting forces to said side sections.

18. In a motor vehicle body structure, a rear structure including side metal portions and a rear panel structure connecting said side portions, a fabricated front structure adapted for structural connection to said side portions, said front structure including a pair of laterally spaced wheelhouse forming compression structures adapted to transmit a portion of the body supporting forces to said side sections, said front structure further including a pair of laterally spaced door columns adapted on assembly of the body structure for attachment to said side portions.

19. In a motor vehicle body structure, fabricated metal top and bottom body rails joined by front and rear fabricated metal columns, fabricated metal structures projecting forwardly from said front columns and rearwardly from said rear columns to provide front and rear wheelhouse structures, and ground wheel supporting means for said body adapted to transmit body supporting forces through said projecting structures to said body top rails.

20. In a motor vehicle body structure, fabricated metal top and bottom body rails joined by front and rear fabricated metal columns, fabricated metal structures projecting forwardly from said front columns and rearwardly from said rear columns to provide front and rear wheelhouse structures, ground wheel supporting means for said body adapted to transmit body supporting forces through said projecting structures to said body top rails, said wheel supporting means including a chassis structure extending substantially the length of the body structure, and means for securing the ends of said projecting structures to said chassis structure.

21. In a motor vehicle body structure, fabricated top rails each including an outer panel curved upwardly and inwardly to provide a roof supporting structure, fabricated bottom rails, fabricated columns connecting said rails, a dash and cowl structure projecting forwardly from said front columns, and means projecting forwardly and downwardly from said columns beyond said dash and cowl structure for supporting the body structure, said supporting means acting to transmit body supporting forces to said rails and columns.

22. In a motor vehicle body structure, side structures each including a fabricated rear door column, a rear panel structure connecting the rear ends of said side structures, said side structures each providing a rear wheelhouse structure, means including a substantially vertical stiffener plate extending rearwardly from each of said columns above one of said wheelhouse structures for bracing said rear panel structure from said columns, and a transverse seat back structure secured to said stiffener plates and to said side structures for laterally bracing the latter.

23. In a motor vehicle body structure, side structures each including a fabricated rear door column, a rear panel structure connecting the rear ends of said side structures, said side structures each providing a rear wheelhouse structure, means including a substantially vertical stiffener plate extending rearwardly from each of said columns above one of said wheelhouse structures for bracing said rear panel structure from said columns, a transverse seat back secured to said stiffener plates for laterally bracing the latter, and a substantially horizontal shelf plate overlying the upper edges of said stiffener plates and connecting the upper portion of said seat back to said side structures and to said rear panel structure.

24. In a motor vehicle body structure, side structures each including a fabricated rear door column, a rear panel structure connecting the rear ends of said side structures, said side structures each providing a rear wheelhouse structure, means including a substantially vertical stiffener plate extending rearwardly from each of said columns above one of said wheelhouse structures for bracing said rear panel structure from said columns, a transverse seat back secured to said stiffener plates and wheelhouse structures for laterally bracing said side structures, and a second stiffener plate spaced inwardly from each of the first said stiffener plates, each of said second stiffener plates structurally connecting a side of said seat back with said rear panel.

25. In a motor vehicle body structure, side structures each including a fabricated rear door column, a rear panel structure connecting the rear ends of said side structures, said side structures each providing a rear wheelhouse structure, means including a substantially vertical stiffener plate extending rearwardly from each of said columns above one of said wheelhouse structures for bracing said rear panel structure from said columns, a transverse seat back secured to said stiffener plates and wheel-house structures for laterally bracing said side structures, a second stiffener plate spaced inwardly from each of the first said stiffener plates, each of said second stiffener plates structurally connecting a side of said seat back with said rear panel, and a substantially horizontal shelf plate overlying the upper edges of each of the aforesaid stiffener plates and connecting the upper portion of said seat back to said rear panel structure.

26. In a motor vehicle body structure, side structures each including a fabricated rear door column, a rear panel structure connecting the rear ends of said side structures, said side structures each providing a rear wheelhouse structure, means including a substantially vertical stiffener plate extending rearwardly from each of said columns above one of said wheelhouse structures for bracing said rear panel structure from said columns, a transverse seat back structure secured to said stiffener plates and to said side structures for laterally bracing the latter, and ground wheel supporting means for the rear of said body structure including body supporting load points located to transmit supporting forces substantially directly through said columns, stiffener plates and seat back structure.

27. In a motor vehicle metal body structure, front and rear door columns at each side of said body structure, top and bottom longitudinal body rails structurally connecting said columns, each of said top rails including inner and outer sheet metal members fabricated to provide a hollow beam, said body structure having an outer panel secured to said top rails between said columns at each side of said body structure, said outer panels being formed at each side of the body structure with an inwardly extending flanged portion thereof secured to the under face of one of said hollow beams and extending downwardly along said columns to provide transversely extending side faces therefor, said outer panels projecting upwardly above said top rails and inwardly thereof to form a roof support.

28. In a motor vehicle body structure, fabricated top rail structures each including an outer body panel curved upwardly and inwardly to provide a roof supporting structure, bottom rail structures, front and rear door columns connecting said rail structures, said front columns and said top rail structures defining marginal portions of a door opening, a front wheel supporting structure extending forwardly of said front columns and including a frame structure constructed and arranged to mount said wheels and the motor vehicle power plant, and a plurality of load transmitting strut means respectively disposed at the sides of said vehicle and extending upwardly and rearwardly from said frame structure, and means for structurally connecting said load transmitting means to said front columns at points intermediate the height thereof and so constructed and arranged to transmit at least a portion of the load on said frame structure compressively through said load transmitting strut means and through the portions of said front columns above said connecting means to said top rail structures.

29. In a motor vehicle body structure, fabricated top rail structures each including an outer body panel curved upwardly and inwardly to provide a roof supporting structure, bottom rail structures, front and rear door columns connecting said rail structures, said front columns and said top rail structures defining marginal portions of a door opening, a front wheel supporting structure extending forwardly of said front columns and including a frame structure constructed and arranged to mount said wheels and the motor vehicle power plant, and a plurality of load transmitting strut means respectively disposed at the sides of said vehicle and extending upwardly and rearwardly from points adjacent the front end of said frame structure, and means for structurally connecting said load transmitting means to said front columns at points intermediate the height thereof and so constructed and arranged to transmit at least a portion of the load on said frame structure compressively through said load transmitting strut means and through the portions of said front columns above said connecting means to said top rail structures.

30. In a motor vehicle body structure, fabricated top rail structures each including an outer body panel curved upwardly and inwardly to provide a roof supporting structure, bottom rail structures, front and rear door columns connecting said rail structures, said front columns and said top rail structures defining marginal portions of a door opening, a front wheel supporting structure extending forwardly of said front columns and including a frame structure constructed and arranged to mount said wheels and the motor vehicle power plant, and a plurality of load transmitting strut means respectively disposed at the sides of said vehicle and extending upwardly and rearwardly from said frame structure, and means for structurally connecting said load transmitting means to said front columns at points intermediate the height thereof so constructed and arranged to transmit at least a portion of the load on said frame structure compressively through said load transmitting strut means and through the portions of said front columns above said connecting means to said top rail structures, the front ends of said top rail structures inclining forwardly and downwardly to form the upper portions of said front columns, said connecting means for said load transmitting means joining said front columns substantially adjacent the respective lower ends of said forwardly and downwardly inclined column portions.

31. In a motor vehicle body structure, fabricated top rail structures each including an outer body panel curved upwardly and inwardly to provide a roof supporting structure, bottom rail structures, front and rear door columns connecting said rail structures, said front columns and said top rail structures defining marginal portions of a door opening, a front wheel supporting structure extending forwardly of said front columns and including a frame structure constructed and arranged to mount said wheels and the motor vehicle power plant, and a plurality of load transmitting strut means respectively disposed at the sides of said vehicle and extending upwardly and rearwardly from said frame structure, and means for structurally connecting said load transmitting means to said front columns at points intermediate the height thereof so constructed and arranged to transmit at least a portion of the load on said frame structure compressively through said load transmitting means and through the portions of said front columns above said connecting means to said top rail structures, each of said top rail structures further including a hollow sheet metal beam.

32. In a motor vehicle body structure, fabricated top rail structures each including an outer stressed body panel curved upwardly and inwardly to provide a roof supporting structure, bottom rail structures, front and rear door columns connecting said rail structures, said front columns to said top rail structures defining marginal portions of a door opening, a front wheel supporting structure extending forwardly of said front columns and including a frame structure constructed and arranged to mount said wheels and the motor vehicle power plant, and a plurality of load transmitting strut means respectively disposed at the sides of said vehicle and extending upwardly and rearwardly from said frame structure, means for structurally connecting said load transmitting means to said front columns at points intermediate the height thereof so constructed and arranged to transmit at least a portion of the load on said frame structure compressively through said load transmitting means and through the portions of said front columns above said connecting means to said top rail structures, and outer panels thereof, said frame structure including a pair of side longitudinally extending chassis rails extending substantially the length of the motor vehicle, and means for mounting said bottom rail structures on said chassis rails.

33. In a motor vehicle body structure, fabricated top rail structures each including an outer stressed body panel curved upwardly and inwardly to provide a roof supporting structure, bottom rail structures, front and rear door columns connecting said rail structures, said front columns and said top rail structures defining marginal portions of a door opening, a front wheel supporting structure extending forwardly of said front columns and including a frame structure constructed and arranged to mount said wheels and the motor vehicle power plant, a plurality of load transmitting strut means respectively disposed at the sides of said vehicle and extending upwardly and rearwardly from said frame structure, means for structurally connecting said load transmitting means to said front columns at points intermediate the height thereof so constructed and arranged to transmit at least a portion of the load on said frame structure compressively through said load transmitting means and through the portions of said front columns above said connecting means to said top rail structures and outer panels thereof, the front ends of said top rail structures inclining forwardly and downwardly to form the upper portions of said front columns, said connecting means for said load transmitting means joining said front columns substantially adjacent the respective lower ends of said forwardly and downwardly inclined column portions, said frame structure including a pair of side longitudinally extending chassis rails extending substantially the length of the motor vehicle, and means for mounting said bottom rail structures on said chassis rails.

34. In a motor vehicle body structure, fabricated top rail structures each including an outer stressed body panel curved upwardly and inwardly to provide a roof supporting structure, bottom rail structures, front and rear door columns connecting said rail structures, said front columns and said top rail structures defining marginal portions of a door opening, a front wheel supporting structure extending forwardly of said front columns and including a frame structure constructed and arranged to mount said wheels and the motor vehicle power plant, and a plurality of load transmitting strut means respectively disposed at the sides of said vehicle and extending upwardly and rearwardly from said frame structure, and means for structurally connecting said load transmitting means to said front columns at points intermediate the height thereof so constructed and arranged to transmit at least a portion of the load on said frame structure compressively through said load transmitting means and through the portions of said front columns above said connecting means to said top rail structures and outer panels thereof, each of said front columns having a lower end portion rising substantially vertically from the forward end of one of said bottom rails and an upper portion inclining rearwardly and upwardly from said lower portion to merge with the forward end of one of said top rail structures, said connecting means for said load transmitting means joining said front columns substantially adjacent the juncture of said vertical and inclined column portions.

35. In a motor vehicle structure, upper and lower body rails, a front wheel and power plant frame-supporting structure projecting forwardly of said lower body rails, rear door column structures connecting said upper and lower body rails, front door column structures extending downwardly from the forward ends respectively of said upper body rails for connection with said lower body rails, a compression strut structure at each side of the vehicle respectively extending forwardly and downwardly from a point intermediate the height of said front columns to said frame supporting structure, said front columns having upper end portions sloping upwardly and rearwardly from substantially the juncture with said strut structures to facilitate the transmission of compressive forces from said strut structures to said upper body rails, said sloping upper end portion of each of said front door columns including an outer body panel having a stressed flange extending transversely of the vehicle and forming a marginal portion of said sloping column portion.

36. In a motor vehicle structure, upper and lower body rails, a front wheel and power plant frame-supporting structure projecting forwardly of said lower body rails, front door column structures extending downwardly from the forward ends respectively of said upper body rails for connection with said lower body rails, rear door column structures connecting said upper and lower body rails, a compression strut structure at each side of the vehicle respectively extending forwardly and downwardly from a point intermediate the height of said front columns to said frame supporting structure, said front columns having upper end portions sloping upwardly and rearwardly from substantially the juncture with said strut structures to facilitate the transmission of compressive forces from said strut structures to said upper body rails, said sloping upper end portion of each of said front door columns including an outer body panel having a stressed flange extending transversely of the vehicle and forming a marginal portion of said sloping column portion, said supporting frame structure comprising a pair of chassis rails extending rearwardly of the vehicle for mounting said lower body rails.

37. In a motor vehicle structure, a body structure having upper and lower longitudinal rails, longitudinally spaced columns connecting said rails at the front and rear end portions of said body structure, a chassis frame comprising side longitudinals mounting said lower body rails and having portions thereof extending forwardly therefrom to approximately the front end of the vehicle, said rails being spaced inwardly from and separated from said longitudinals between said columns, means connecting said rails and longitudinals and disposed across the space therebetween, and bracing means for structurally connecting said extending portions of said longitudinals with the foremost of said columns, said bracing means including side strut structures extending forwardly and downwardly from the last said columns.

38. In a motor vehicle body structure, forward front door column structures at opposite sides of said compartment, a roof structure extending between said column structures to provide therewith a windshield frame, said roof structure including side rail structures extending rearwardly respectively from said front column structures, each of said front door column structures extending downwardly from the forward end of one of said rail structures, ground wheel supporting means projecting forwardly from said column structures, a cowl and dash structure projecting forwardly of said column structures and windshield frame, means for transmitting at least a portion of the load on said supporting means to said column structures and to said cowl and dash structure, and a substantially central windshield frame brace extending downwardly from said roof structure for transmitting forces thereto from said cowl and dash structure.

39. In a motor vehicle body structure having a driver's compartment, a fabricated metal door column forwardly of said compartment, a fabricated metal roof rail extending longitudinally of the vehicle from said column, the upper end of said column and the forward end of said roof rail providing a substantially continuous load transmitting beam of hollow cross-section, said column including an outer panel forming the outer skin of the body structure at said roof rail, the juncture of said column and roof rail curving to facilitate the transmission of compression forces therebetween, said roof rail including an inner hollow beam forming channeled member having a longitudinally extending lower face connected to said outer panel, said panel curving upwardly and inwardly above said channel member free from engagement with the longitudinally extending upper flange thereof.

40. In a motor vehicle metal body structure, front and rear door columns at each side of said body structure, top and bottom longitudinal body rails structurally connecting said columns, each of said top rails including inner and outer sheet metal members fabricated to provide a hollow beam, said body structure having an outer panel structurally associated with one of said hollow beams at each side of the body structure, each of said outer panels having an inwardly extending lower flanged portion secured to the under face of one of said hollow beams intermediate said columns, each of said outer panels having a further portion thereof spaced laterally outwardly from the associated hollow beam and extending to project upwardly above said associated hollow beam and inwardly thereof to form a roof support.

41. In a metal automobile body, a cowl brace extending upwardly for substantially the full height of the cowl, a strip secured to the edge of the cowl brace and extending outwardly and rearwardly to the edge of the front door opening, a channel member secured to the strip and extending the full height of the door and forming with the strip a front door post, and an outer shell applied to and secured at its edge to the meeting edges of the channel and the strip.

CARL BREER.
ALEXANDER G. HERRESHOFF.
OLIVER H. CLARK.
ROBERT CADWALLADER.